(12) United States Patent
Jang et al.

(10) Patent No.: US 11,186,193 B2
(45) Date of Patent: Nov. 30, 2021

(54) SYSTEM AND METHOD FOR CONTROLLING CHARGING POWER OF ECO-FRIENDLY VEHICLE

(71) Applicants: Hyundai Motor Company, Seoul (KR); Kia Motors Corporation, Seoul (KR)

(72) Inventors: Hui Sung Jang, Gyeonggi-do (KR); Dong Gyun Woo, Gyeonggi-do (KR); Hyun Wook Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 132 days.

(21) Appl. No.: 16/655,273

(22) Filed: Oct. 17, 2019

(65) Prior Publication Data
US 2020/0331357 A1  Oct. 22, 2020

(30) Foreign Application Priority Data

Apr. 22, 2019 (KR) .......... 10-2019-0046648

(51) Int. Cl.
| | |
|---|---|
| *B60L 53/62* | (2019.01) |
| *H02M 7/5387* | (2007.01) |
| *H02M 1/44* | (2007.01) |
| *B60L 53/22* | (2019.01) |
| *B60L 50/60* | (2019.01) |

(52) U.S. Cl.
CPC .............. *B60L 53/62* (2019.02); *B60L 50/66* (2019.02); *B60L 53/22* (2019.02); *H02M 1/44* (2013.01); *H02M 7/53871* (2013.01); *B60L 2210/10* (2013.01); *B60L 2240/547* (2013.01)

(58) Field of Classification Search
CPC .... B60L 53/62; B60L 2240/547; B60L 50/66; B60L 2210/10; B60L 53/22; H02M 7/53871; H02M 1/44
USPC ........................................................ 320/109
See application file for complete search history.

(56) References Cited

U.S. PATENT DOCUMENTS

| | | | |
|---|---|---|---|
| 8,503,208 B2 | 8/2013 | Krause | |
| 9,153,996 B2 | 10/2015 | de Sousa et al. | |
| 9,184,587 B2* | 11/2015 | Mizuno | ..................... B60L 3/04 |
| 9,479,157 B2* | 10/2016 | Hanamura et al. | ... B60L 15/007 |

(Continued)

FOREIGN PATENT DOCUMENTS

| | | |
|---|---|---|
| JP | 5874990 B2 | 3/2016 |
| KR | 101679955 B1 | 12/2016 |

*Primary Examiner* — Sun J Lin
(74) *Attorney, Agent, or Firm* — Mintz Levin Cohn Ferris Glovsky and Popeo, P.C.; Peter F. Corless

(57) ABSTRACT

A system for controlling charging power of an eco-friendly vehicle is provided. The system includes a battery, a power supply unit supplying AC power, and an inverter having a plurality of legs including a plurality of power conversion devices. Legs of the plurality of legs are supplied with power by being connected with the power supply unit and both ends of each leg of the legs being connected with the battery. One or more switches are disposed between one or more legs of the plurality of legs and the power supply unit. A controller changes a power transmission path from the power supply unit by determining a phase of a power that is supplied from the power supply unit and by operating each switch of the one or more switches based on the phase of the supplied power.

13 Claims, 4 Drawing Sheets

(56) References Cited

U.S. PATENT DOCUMENTS

| | | | |
|---|---|---|---|
| 9,493,088 B2* | 11/2016 | Wei et al. | B60L 53/16 |
| 9,718,374 B2* | 8/2017 | Tang et al. | B60L 58/12 |
| 10,205,401 B1* | 2/2019 | Nikitin | H02M 7/797 |
| 10,637,294 B2* | 4/2020 | Sarwat et al. | B60L 53/12 |
| 2009/0184681 A1* | 7/2009 | Kuno | B60L 53/14 |
| | | | 320/128 |

* cited by examiner

SYSTEM AND METHOD FOR CONTROLLING CHARGING POWER OF ECO-FRIENDLY VEHICLE

CROSS REFERENCE TO RELATED APPLICATION

The present application claims priority of Korean Patent Application No. 10-2019-0046648 filed on Apr. 22, 2019, the entire contents of which is incorporated herein for all purposes by this reference.

BACKGROUND OF THE INVENTION

1. Field of the invention

The present disclosure relates to a system and method for controlling charging power of an eco-friendly vehicle and, more particularly, to a system and method for controlling charging power of an eco-friendly vehicle to increase available-for-charging power for 1-phase charging in a charging system that performs 1-phase and 3-phase charging.

2. Description of the Prior Art

A pure electric vehicle, a hybrid vehicle, and fuel cell vehicle have been actively developed to satisfy enforced regulations on automotive exhaust gas. Eco-friendly vehicles are equipped with a motor and a battery, in which the motor may complement engine torque and produces electricity through regenerative braking by reversing when the vehicle is decelerated, thereby being able to charge the battery. The battery mounted in eco-friendly vehicles may be slowly charged through a slow-charging device or may be rapidly charged through the quick-charging device.

The slow-charging includes 1-phase charging and 3-phase charging and one of On Board Charger (OBC) topologies that may satisfy both of the two charging methods is a 3-leg inverter. However, according to 3-leg inverters of the related art, the available-for-charging power for 1-phase charging and 3-phase charging is different. In particular, power is not transmitted to one of three legs in 1-phase charging, and thus, charging is performed with lower power than 3-phase charging causing the charging time to increase.

SUMMARY

The present disclosure provides a system and method for controlling charging power of an eco-friendly vehicle, the system and method being able to increase charging power in 1-phase charging and accordingly reduce charging time by determining the phase of power that is supplied from a power supply unit and changing a power transmission path from the power supply unit by controlling a switch based on the phase of the supplied power.

In view of an aspect, a system for controlling charging power of an eco-friendly vehicle according to the present disclosure may include: a battery; an inverter having a plurality of legs including a plurality of power conversion devices, the legs being supplied with power by being connected with a power supply unit and both ends of each of the legs being connected with the battery; one or more switches disposed between one or more of the legs and the power supply unit; and a controller configured to change a power transmission path from the power supply unit by determining the phase of power that is supplied from the power supply unit and by operating the switch based on the phase of the supplied power.

The inverter may include: a first leg, a second leg, a third leg, and a fourth leg. The first leg may include a first power conversion device and a second power conversion device, the second leg may include a third power conversion device and a fourth power conversion device, the third leg may include a fifth power conversion device and a sixth power conversion device; and the fourth leg may include a seventh power conversion device and an eighth power conversion device.

The switch may include a first switch disposed between the power supply unit and the second leg and a second switch disposed between the power supply unit and the third leg. The first switch and the second switch may be 3-way relay switches. When a phase that is supplied from the power supply unit is 1-phase, the controller may connect a first end of the first switch to the first leg and a second end of the first switch to the second leg, and may connect a first end of the second switch to the fourth leg and a second end of the second switch to the third leg.

When a phase that is supplied from the power supply unit is 3-phase, the controller may connect a first end of the first switch to the power supply unit and a second end of the first switch to the second leg, and may connect a first end of the second switch to the power supply unit and a second end of the second switch to the third leg. When connection with the power supply unit has not been made, the controller may connect the first end of the first switch to the power supply unit and the second end of the first switch to the second leg, and may connect the first end of the second switch to the power supply unit and the second end of the second switch to the third leg.

The controller may include: a power connection determiner configured to determine whether connection with the power supply unit has been made; a phase determiner configured to determine the phase of power that is supplied from the power supply unit; a power conversion device controller configured to switch the power conversion devices; a switch controller configured to operate the switch; and a voltage sensor configured to sense voltage that is supplied from the power supply unit.

Rated capacities of the third power conversion device, the fourth power conversion device, the fifth power conversion device, and the sixth power conversion device may be smaller than rated capacities of the first power conversion device, the second power conversion device, the seventh power conversion device, and the eighth power conversion device. The system may further include: an Electromagnetic Interference (EMI) disposed between the power supply unit and the inverter; a direct current-direct current (DC-DC) converter configured to convert output voltage of the inverter between the inverter and the battery; and a capacitor disposed between the inverter and the DC-DC converter.

In view of another aspect, a method of controlling charging power of an eco-friendly vehicle according to the present disclosure may include: determining whether connection with a power supply unit has been made; determining the phase of power that is supplied from the power supply unit; and changing a power transmission path from the power supply unit based on whether connection with the power supply unit has been made and the phase of the power that is supplied from the power supply unit.

In the changing of a power transmission path from the power supply unit, when connection with the power supply unit has been made and the phase that is supplied from the power supply unit is 3-phase, a first end of a first switch may be connected to the power supply unit, a second end of the first switch may be connected to a second leg, a first end of a second switch may be connected to the power supply unit, and a second end of the second switch may be connected to a third leg.

Further, in the changing of a power transmission path from the power supply unit, when the phase that is supplied from the power supply unit is 1-phase, a first end of the first switch may be connected to the first leg, a second end of the first switch may be connected to the second leg, a first end of a second switch may be connected to a fourth leg, and a second end of the second switch may be connected to the third leg. Further, in the changing of a power transmission path from the power supply unit, when connection with the power supply unit has not been made, a first end of a first switch may be connected to the power supply unit, a second end of the first switch may be connected to a second leg, a first end of a second switch may be connected to the power supply unit, and a second end of the second switch may be connected to a third leg.

According to the system for controlling charging power of an eco-friendly vehicle of the present disclosure, by changing the power transmission path from the power supply unit by operating the switch based on the phase of the power that is supplied from the power supply unit, it may be possible to increase available-for-charging power when the power that is supplied from the power supply unit is 1-phase, to thus reduce the time for charging a battery.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A system and method for controlling charging power of an eco-friendly vehicle according to an exemplary embodiment of the present disclosure will be described herein with reference to the accompanying drawings.

Figure 1:
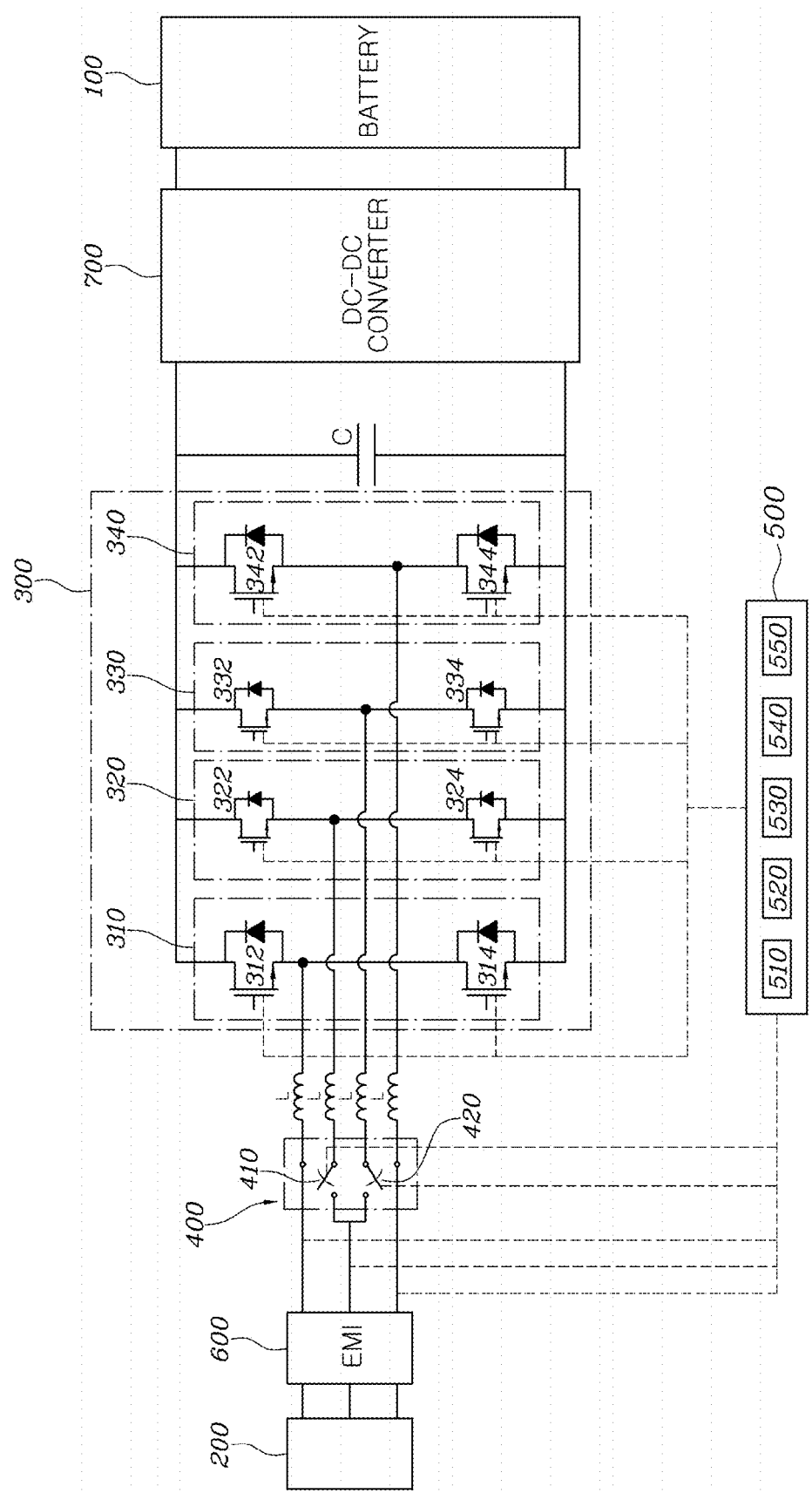
FIG. 1 is a diagram schematically showing the entire configuration of a system for controlling charging power of an eco-friendly vehicle according to an exemplary embodiment of the present disclosure.

Referring to FIG. 1, a system for controlling charging power of an eco-friendly vehicle according to an exemplary embodiment of the present disclosure may include a battery 100, a power supply unit 200, an inverter 300, a switch 400, and a controller 500, and may further include an electromagnetic wave interface (EMI) 600, a DC-DC converter 700, and a capacitor C.

In particular, the battery 100 provides energy for driving a motor (not shown) mounted within an eco-friendly vehicle and may be a high-voltage battery. The power supply unit 200 may be configured to supply alternating current (AC) power for charging the battery 100. The power supply unit 200 may be electric vehicle supply equipment (EVSE) at a charge station that provides power for charging the automotive battery 100.

The inverter 300 may include a plurality of legs having a plurality of power conversion devices 312, 314, 322, 324, 332, 334, 342, and 344 and the legs 310, 320, 330, and 340 may be connected with the power supply unit 200, thereby being supplied with power. Both ends of the inverter 300 may be connected with the battery 100, and thus, the inverter 300 may be configured to charge the battery 100 by converting power supplied from the power supply unit 200.

Particularly, as shown in FIG. 1, the inverter 300 may include a first leg 310, a second leg 320, a third leg 330, and a fourth leg 340. The first leg 310 may include a first power conversion device 312 and a second power conversion device 314, the second leg 320 may include a third power conversion device 322 and a fourth power conversion device 324, the third leg 330 may include a fifth power conversion device 332 and a sixth power conversion device 334, and the fourth leg 340 may include a seventh power conversion device 342 and an eighth power conversion device 344.

Depending on exemplary embodiments, the rated capacities of the third power conversion device 322, the fourth power conversion device 324, the fifth power conversion device 332, and the sixth power conversion device 334 may be smaller than those of the first power conversion device 312, the second power conversion device 314, the seventh power conversion device 342, and the eighth power conversion device 344. The rated capacity may include information such as rated power, rated voltage, and rate current.

For example, when the rated power of the first power conversion device 312, the second power conversion device 314, the seventh power conversion device 342, and the eighth power conversion device 344 is about 14 KW, the rated power of the third power conversion device 322, the fourth power conversion device 324, the fifth power conversion device 332, and the sixth power conversion device 334 may be about 7 KW. Further, when the rated current of the first power conversion device 312, the second power conversion device 314, the seventh power conversion device 342, and the eighth power conversion device 344 is about 40A, the rated current of the third power conversion device 322, the fourth power conversion device 324, the fifth power conversion device 332, and the sixth power conversion device 334 may be about 20A.

The switch 400 may be disposed between one or more of the legs of the inverter 300 and the power supply unit 200.

In particular, the switch 400, as shown in FIG. 1, may include a first switch 410 disposed between the power supply unit 200 and the second leg 320 and a second switch 420 disposed between the power supply unit 200 and the third leg 330. The first switch 410 and the second switch 420 may be 3-way relay switches.

The controller 500 may be configured to change a power transmission path from the power supply unit 200 by determining the phase of power that is supplied from the power supply unit 200, and operate the switch 400 based on the phase of the supplied power. In particular, the controller 500 may include a power connection determiner 510, a phase determiner 520, a power conversion device controller 530, a switch controller 540, and a voltage sensor 550.

The power connection determiner 510 may be configured to determine a connection with the power supply unit 200, and the information regarding connection with the power supply unit 200 determined by the power connection determiner 510 may be used later for the switch controller 540 to operate the switch 400. The phase determiner 520 may be configured to determine the phase of the power that is supplied from the power supply unit 200. In other words, the phase determiner 520 may be configured to determine whether the power that is supplied from the power supply unit 200 is 1-phase or 3-phase and the phase information of the power determined by the phase determiner 520 may be used later for the switch controller 540 to operate the switch 400.

The power conversion device controller 530 may be configured to execute switching of a plurality of power conversion devices. In particular, when the converter 300 includes the first power conversion device 312 to the eighth power conversion device 344 in accordance with an exemplary embodiment, the power conversion device controller 530 may be configured to switch the power conversion devices by applying a signal to gates of the power conversion devices. The switch controller 540 maybe configured to operate the switch 400 based on the information about connection with the power supply unit 200 determined by the power connection determiner 510 and the phase information of the power supply unit 200 determined by the phase determiner 520. The voltage sensor 550 may be configured to sense AC power that is supplied from the power supply unit 200.

It is exemplified in the following description that the controller 500 may be configured to determine whether connection with the power supply unit 200 has been made and the phase of power that is supplied from the power supply unit 200, and change a power transmission path from the power supply unit 200 by operating the switch 400 based on the phase of the supplied power.

Figure 2:
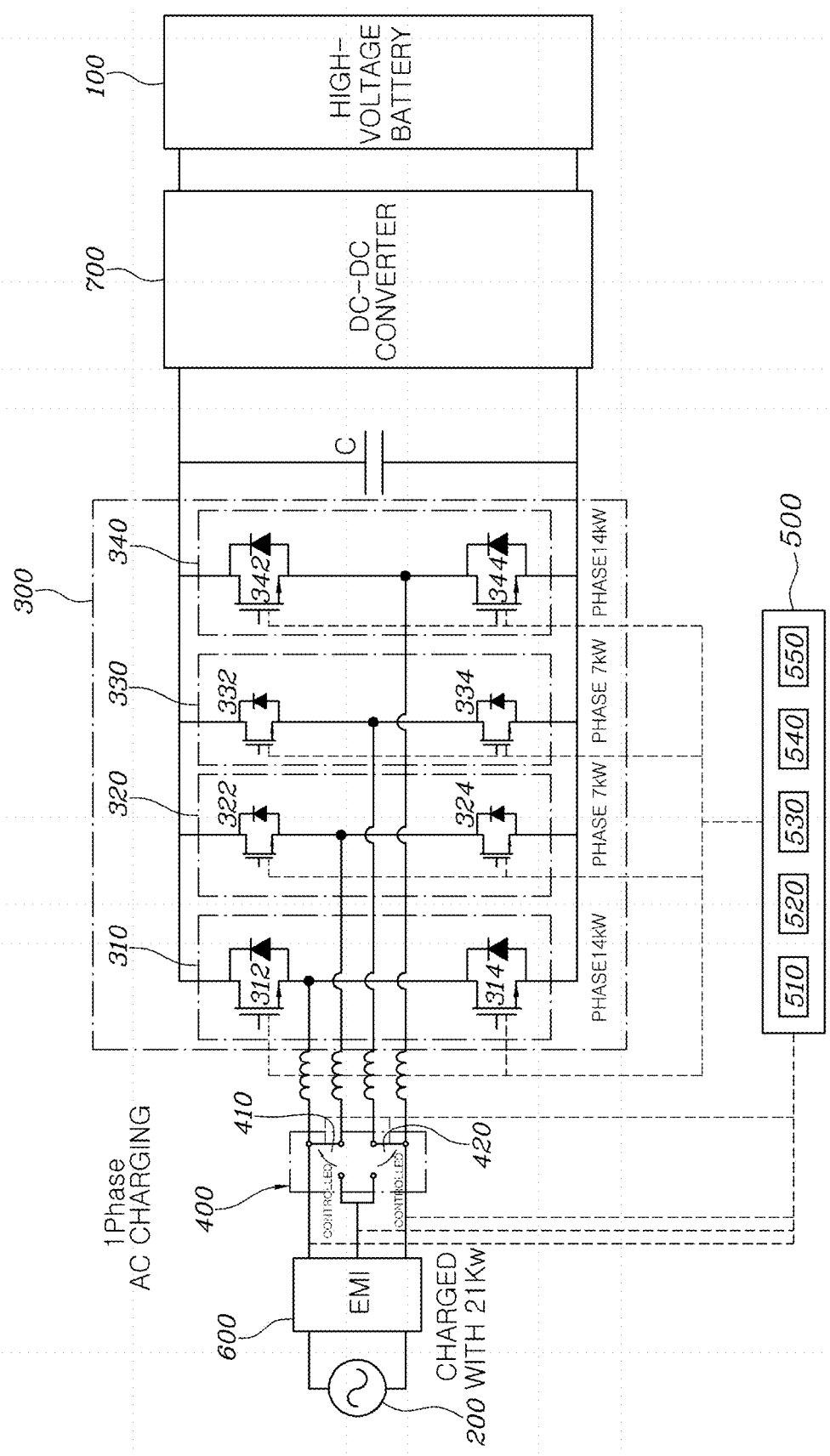
FIG. 2 is a diagram showing a power transmission path when the phase that is provided from a power supply unit is 1-phase in the system for controlling charging power of an eco-friendly vehicle according to an exemplary embodiment of the present disclosure.

In accordance with an exemplary embodiment, when the phase that is supplied from the power supply unit 200 is 1-phase, as shown in FIG. 2, the controller 500 may connect a first end of the first switch 410 to the first leg 310 and a second end of the first switch 410 to the second leg 320. Further, the controller 500 may connect a first end of the second switch 420 to the fourth leg 340 and a second end of the second switch 420 to the third leg 330.

Figure 3:
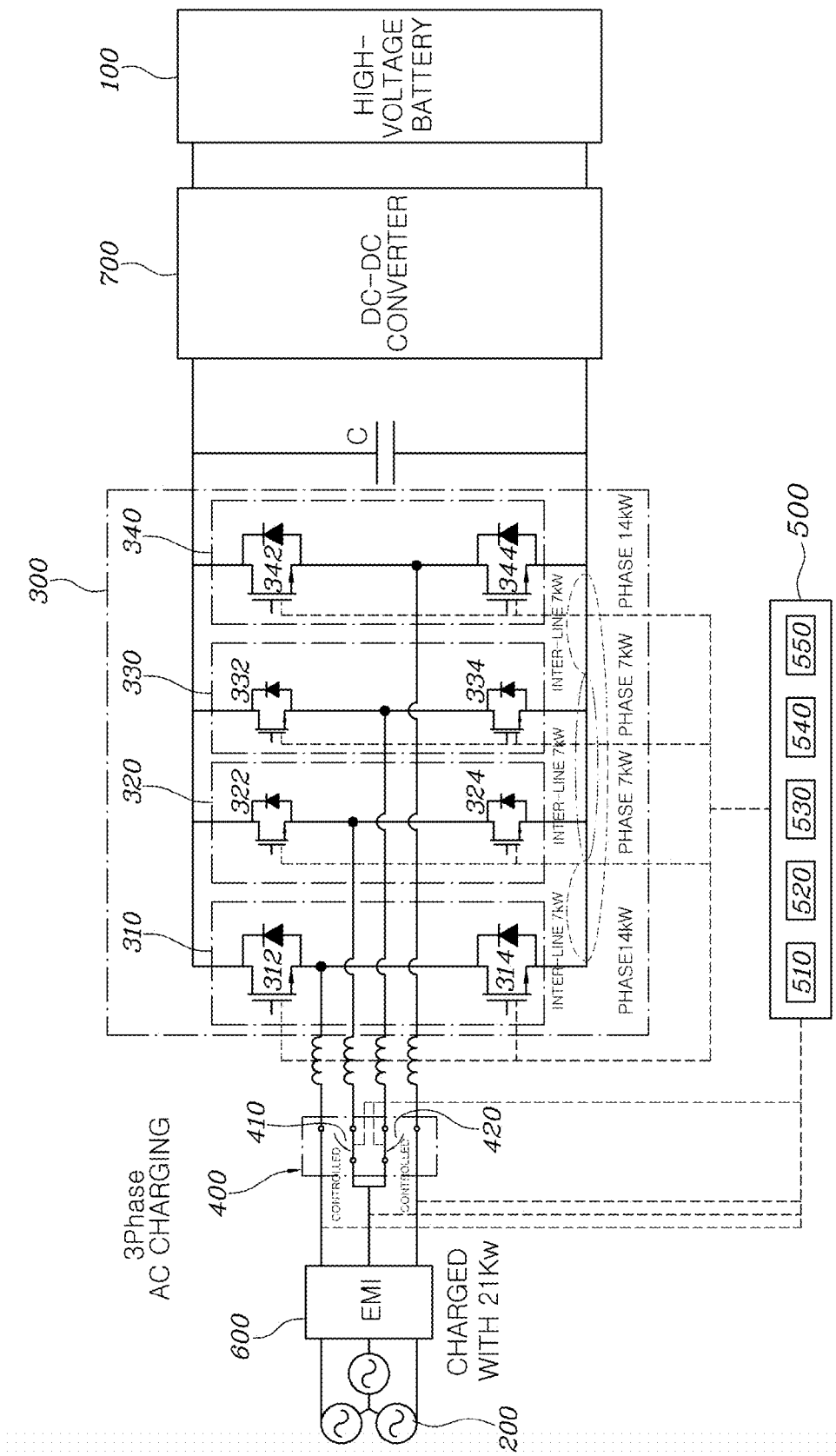
FIG. 3 is a diagram showing a power transmission path when the phase that is provided from a power supply unit is 3-phase in the system for controlling charging power of an eco-friendly vehicle according to an exemplary embodiment of the present disclosure.

In accordance with another exemplary embodiment, when the phase that is supplied from the power supply unit 200 is 3-phase, as shown in FIG. 3, the controller 500 may connect a first end of the first switch 310 to the power supply unit 200 and a second end of the first switch 410 to the second leg 320. Further, the controller 500 may connect a first end of the second switch 320 to the power supply unit 200 and a second end of the second switch 320 to the third leg 330.

In accordance with yet another exemplary embodiment, when connection with the power supply unit 200 has not been made, the controller 500 may connect a first end of the first switch 410 to the power supply unit 200 and a second end of the first switch 410 to the second leg 320. Further, the controller 500 may connect a first end of the second switch 420 to the power supply unit 200 and a second end of the second switch 420 to the third leg 330.

As described above, according to the system for controlling charging power of an eco-friendly vehicle of the present disclosure, by changing the power transmission path from the power supply unit 200 by operating the switch 400 based on the phase of the power that is supplied from the power supply unit 200, it may be possible to increase available-for-charging power when the power that is supplied from the power supply unit 200 is 3-phase and thus, reduce the time for charging a battery.

Furthermore, the electromagnetic interference filter (EMI) 600 may be disposed between the power supply unit 200 and the inverter 300 and may be configured to block electromagnetic waves from the power supply unit 200. The DC-DC converter 700 may be disposed between the inverter 300 and the battery 100 and may be configured to convert and provide output voltage of the inverter 300 to the battery 100. The capacitor C may be disposed between the inverter 300 and the DC-DC converter 700, and an inductor L may be disposed between each of the legs of the inverter 300 and the power unit 200.

Figure 4:
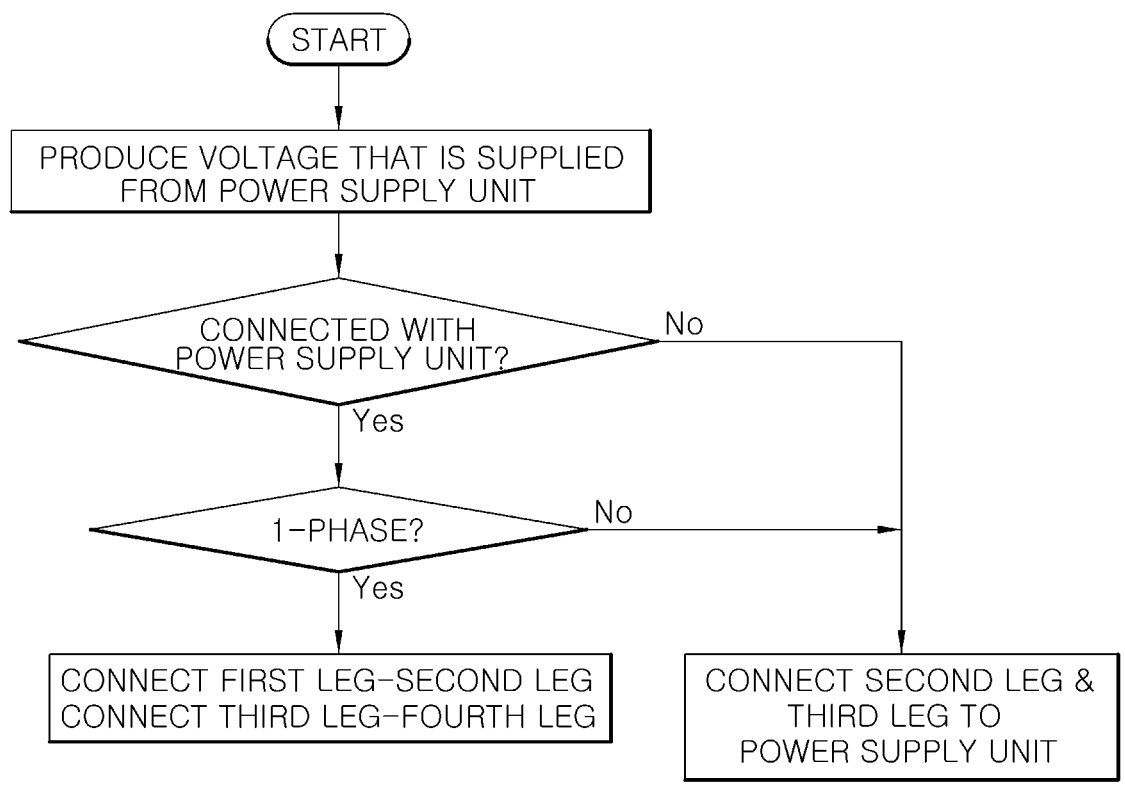
FIG. 4 is a flowchart showing a method of controlling charging power of an eco-friendly vehicle according to an exemplary embodiment of the present disclosure.

FIG. 4 is a flowchart showing a method of controlling charging power of an eco-friendly vehicle according to an exemplary embodiment of the present disclosure. The method described herein below may be executed by the controller. Referring to FIG. 4, the method of controlling charging power of an eco-friendly vehicle according to an exemplary embodiment of the present disclosure may include: determining whether connection with a power supply unit has been made; determining the phase of power that is supplied from the power supply unit; and changing a power transmission path from the power supply unit based on whether connection with the power supply unit has been made and the phase of the power that is supplied from the power supply unit. The method may further include sensing AC voltage that is supplied from the power supply unit before the determining of whether connection with a power supply unit has been made.

In particular, in the changing of a power transmission path from the power supply unit, when connection with the power supply unit has been made and the phase that is supplied from the power supply unit is 3-phase, it may be possible to connect a first end of a first switch to the power supply unit, a second end of the first switch to a second leg, a first end of a second switch to the power supply unit, and a second end of the second switch to a third leg.

Further, in the changing of a power transmission path from the power supply unit, when the phase that is supplied from the power supply unit is 1-phase, it may be possible to connect a first end of the first switch to the first leg, a second end of the first switch to the second leg, a first end of the second switch to a fourth leg, and a second end of the second switch to the third leg. Additionally, in the changing of a power transmission path from the power supply unit, when connection with the power supply unit has not been made, it may be possible to connect a first end of a first switch to the power supply unit, a second end of the first switch to the second leg, a first end of the second switch to the power supply unit, and a second end of the second switch to the third leg.

What is claimed is:

1. A system for controlling charging power of an eco-friendly vehicle, the system comprising:
a battery;
an inverter having a plurality of legs including a plurality o power conversion devices, the plurality of legs being supplied with power by being connected with a power supply unit and both ends of each leg of the plurality of legs being connected with the battery;
one or more switches disposed between one or more legs of the plurality of legs and the power supply unit; and
a controller configured to change a power transmission path from the power supply unit by determining a phase of a power that is supplied from the power supply unit and by operating each switch of the one or more switches based on the phase of the supplied power,
wherein the inverter includes:
a first leg, a second leg, a third leg, and a fourth leg,
the first leg includes a first power conversion device and a second power conversion device,
the second leg includes a third power conversion device and a fourth power conversion device,
the third leg includes a fifth power conversion device and a sixth power conversion device; and
the fourth leg includes a seventh power conversion device and an eighth power conversion device, and
wherein rated capacitites of the third power conversion device, the fourth power conversion device, the fifth power conversion device, and the sixth power conversion device are smaller than rated capacities of the first power conversion device, the second power conversion device, the seventh power conversion device, and the eighth power conversion device.

2. The system of claim 1, wherein the one or more switches include a first switch disposed between the power supply unit and the second leg and a second switch disposed between the power supply unit and the third leg.

3. The system of claim 2, wherein the first switch and the second switch are 3-way relay switches.

4. The system of claim 2, wherein when a phase that is supplied from the power supply unit is 1-phase, the controller connects a first end of the first switch to the first leg and a second end of the first switch to the second leg, and connects a first end of the second switch to the fourth leg and a second end of the second switch to the third leg.

5. The system of claim 2, wherein when a phase that is supplied from the power supply unit is 3-phase, the controller connects a first end of the first switch to the power supply unit and a second end of the first switch to the second leg, and connects a first end of the second switch to the power supply unit and a second end of the second switch to the third leg.

6. The system of claim 2, wherein when a connection with the power supply unit has not been made, the controller connects a first end of the first switch to the power supply unit and a second end of the first switch to the second leg, and connects a first end of the second switch to the power supply unit and a second end of the second switch to the third leg.

7. The system of claim 1, wherein the controller includes:
a power connection determiner configured to determine a connection with the power supply unit;
a phase determiner configured to determine the phase of power that is supplied from the power supply unit;
a power conversion device controller configured to execute switching of the plurality of power conversion devices;
a switch controller configured to operate each switch of the one or more switches; and
a voltage sensor configured to sense a voltage that is supplied from the power supply unit.

8. The system of claim 1, further comprising:
an electromagnetic interference (EMI) filter disposed between the power supply unit and the inverter;
a direct current-direct current (DC-DC) converter configured to convert output voltage of the inverter between the inverter and the battery; and
a capacitor disposed between the inverter and the DC-DC converter.

9. A method of controlling charging power of an eco-friendly vehicle using the system of claim 1, the method comprising:
determining, by the controller, a connection with a power supply unit;
determining, by the controller, a phase of a power that is supplied from the power supply unit; and
changing, by the controller, a power transmission path from the power supply unit based on the connection with the power supply unit and the phase of the power that is supplied from the power supply unit.

10. The method of claim 9, wherein the inverter includes:
the first leg, the second leg, the third leg, and the fourth leg,
the first leg includes the first power conversion device and the second power conversion device,
the second leg includes the third power conversion device and the fourth power conversion device,
the third leg includes the fifth power conversion device and the sixth power conversion device; and
the fourth leg includes the seventh power conversion device and the eighth power conversion device,
wherein the one or more switches include a first switch disposed between the power supply unit and the second leg and a second switch disposed between the power supply unit and the third leg.

11. The method of claim 10, wherein, in the changing of a power transmission path from the power supply unit, when the phase of the power that is supplied from the power supply unit is 1-phase, a first end of the first switch is connected to the first leg, a second end of the first switch is connected to the second leg, a first end of a second switch is connected to a fourth leg, and a second end of the second switch is connected to the third leg.

12. The method of claim 10, wherein in the changing of a power transmission path from the power supply unit, when no connection is detected with the power supply unit, a first end of a first switch is connected to the power supply unit, a second end of the first switch is connected to a second leg, a first end of a second switch is connected to the power supply unit, and a second end of the second switch is connected to a third leg.

13. The method of claim 10, wherein in the changing of a power transmission path from the power supply unit, in response to detecting the connection with the power supply unit and when the phase of the power that is supplied from the power supply unit is 3-phase, a first end of a first switch is connected to the power supply unit, a second end of the first switch is connected to a second leg, a first end of a second switch is connected to the power supply unit, and a second end of the second switch is connected to a third leg.

* * * * *